July 25, 1950 E. L. MOYER 2,516,406
AIRCRAFT WING FLAP CONTROL
Filed April 23, 1945 3 Sheets-Sheet 2

INVENTOR.
EDWARD L. MOYER
BY George F. Goodyear
ATTORNEY

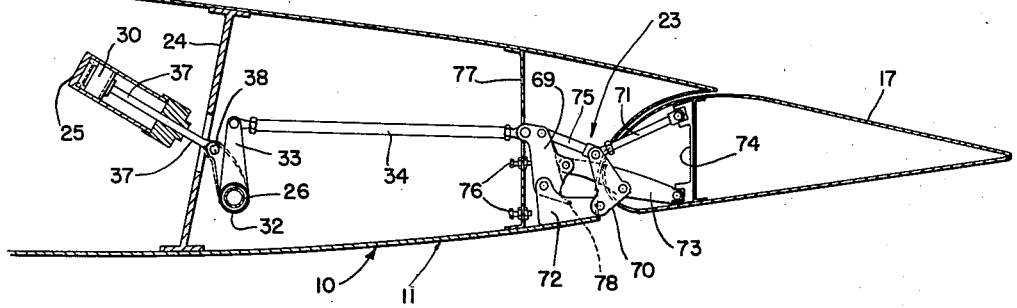

Patented July 25, 1950

2,516,406

UNITED STATES PATENT OFFICE 2,516,406

AIRCRAFT WING FLAP CONTROL

Edward L. Moyer, Reynoldsburg, Ohio, assignor to Curtiss-Wright Corporation, a corporation of Delaware Application April 23, 1945, Serial No. 589,922

6 Claims. (Cl. 244—42)

The present invention is concerned with aircraft control systems generally and more specifically with means for aiding in the safe operation of aircraft auxiliary lift means.

Aircraft auxiliary lift means or what may be more familiarly termed flaps, function to change or modify the airfoil contour or section of the normal wing for the purpose of modifying its lifting characteristics. This airfoil modifying action of flaps is accomplished, as here, by downwardly and rearwardly extendable surfaces suitably mounted at the trailing edge of the main airfoil. The flaps are generally controllable or adjustable so that for take-off added lift with not much increase in drag may be developed, or for landing increased lift and drag may be availed of to reduce the forward speed.

Auxiliary lift means or flaps are important controls for the present day high speed aircraft. Accordingly, this invention is directed to improved means for protecting the flaps and associated control system against damage either due to excessive air loads or for other reasons. The operation of flaps at times when the aircraft is traveling at speeds which develop air loads in excess of that for which the flaps are designed will subject the flaps and associated control means to severe and damaging forces. It is also possible in turbulent air for flaps to be subject to sudden overloads. In the case of hydroaircraft, rough water conditions may be detrimental as the water spray kicked up by the floats and directed against the flaps can develop impact loads sufficient to damage the flaps and the operating mechanism.

It is therefore an object of this invention to provide an aircraft with flap operating means which will act in a manner positively to relieve excessive loads and yet function to control the flap for predetermined and safe operating conditions.

It is also an object to provide novel and improved means for accomplishing the foregoing object whereby an aircraft may be operated with greater safety.

These and other objects and advantages will be pointed out in connection with the description of one form of the invention shown in the accompanying drawing, in which:

Figure 3 is a sectional plan view of an assembly detail as seen along line 3—3 in Figure 2.

Figure 4 is a sectional elevational view of another assembly detail at line 4—4 of Figure 2.

Figure 5 is a schematic sectional elevation illustrating the flap closed condition for the operating means, the view being taken at line 5—5 in Figure 1.

Figure 6 is a schematic sectional elevation similar to Figure 5 but illustrating the flap partly extended in full line and in displaced overload position in dotted outline.

Figure 7 illustrates a further phase in the flap operation differing from the preceding views in that the flap mechanism has been moved (dotted outline) to exert a predetermined pre-load with the flap fully extended.

Figure 8 is similar to Figure 7 but shows the flap overload reaction (dotted outline) with respect to its extended condition.

Figure 1:
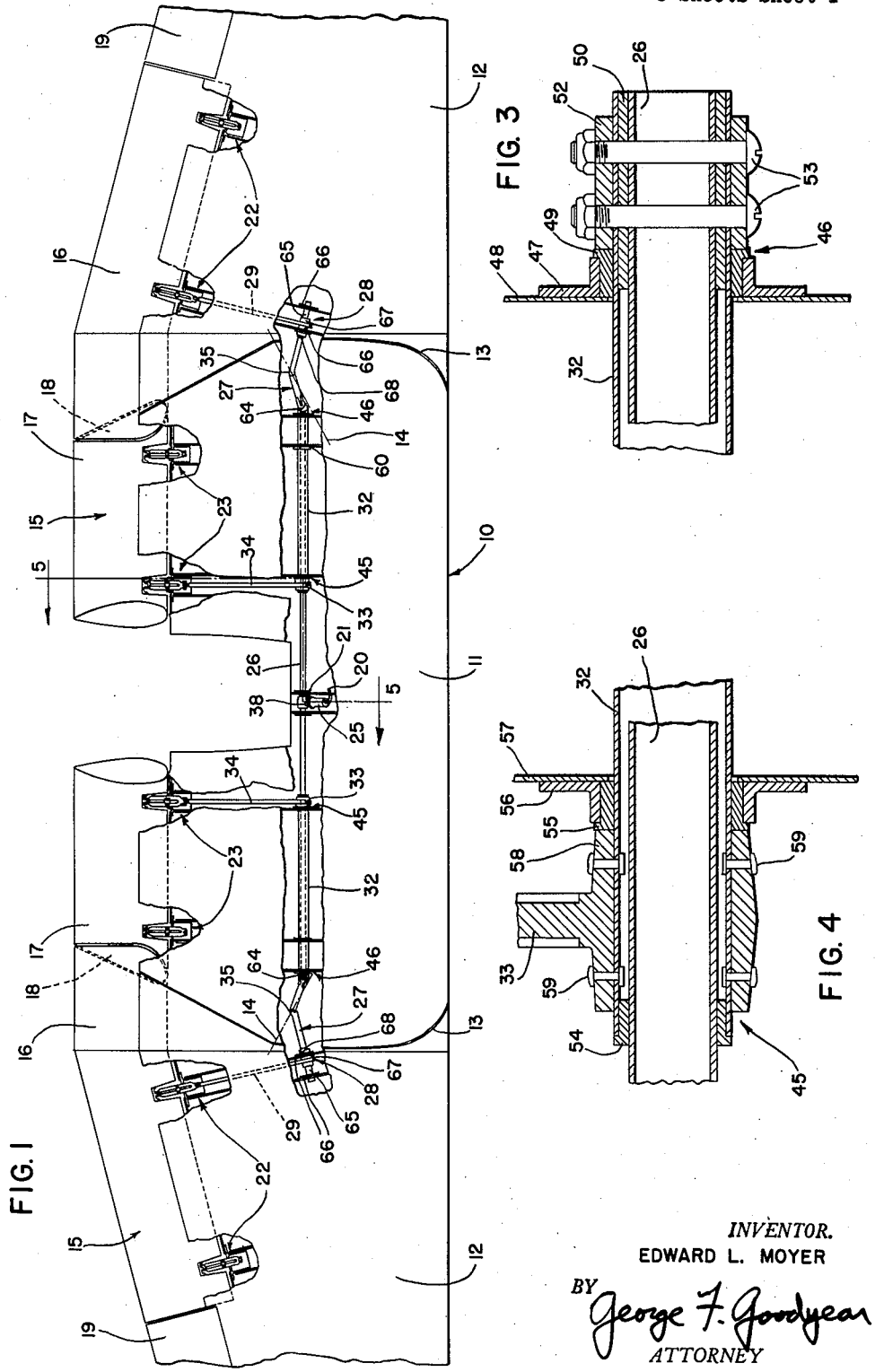
Figure 1 is a fragmentary top plan view of an airfoil or wing in which upper surface portions have been broken away and obvious structure omitted in order to show more clearly the general arrangement of the present invention.

In the drawing, and particularly Figure 1, it is preferred to show the features of this invention in connection with a wing structure 10 which is arranged with a center panel section 11 and right and left outer panel sections 12, each of which folds with respect to the center section along the fold parting line 13 and about respective skewed hinge axis 14. Due to this foldable wing construction the more usual auxiliary lift surfaces or flaps, located one on each side of the longitudinal center line of the aircraft as at 15, have been subdivided into outer and inner flap elements 16 and 17 by cutting through the same along a skewed plane 18 which is so chosen that each outer wing panel and associated flap element may fold easily and without interference. The features of this invention should be understood as equally applicable to the more usual flap arrangement even though it is disclosed in connection with subdivided flaps. In addition, the wing 10 is arranged to mount ailerons 19 outwardly of the flap elements 16.

The flap elements 16 are each suitably mounted for pivotal movement upon a pair of levered hinge structures 22 such that the elements may move rearwardly and downwardly to open a gap at the wing trailing edge. The flap elements 17 also are each mounted upon substantially similar levered hinge structures 23. These hinges 22 and 23 are arranged to establish desirable motions which, though angularly related, constrain the adjacent flap elements to move in substantially similar and cooperating paths with a minimum tendency to separate at the skewed folding or parting plane 18.

Figure 2:
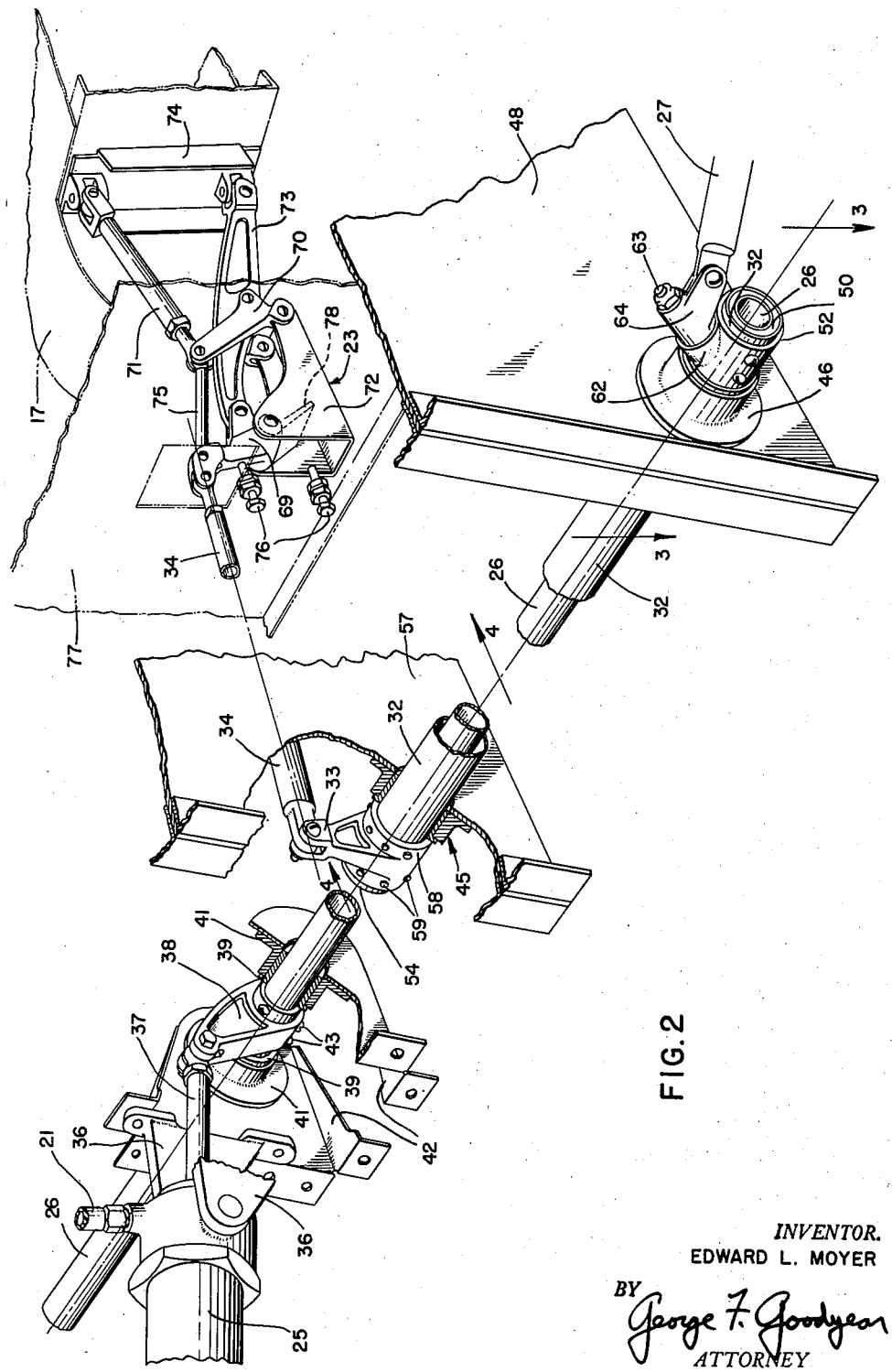
Figure 2 is an enlarged but fragmentary perspective view of the preferred means for operating wing flaps in which certain portions of the structure have been broken away.

The preferred flap operating mechanism and position control system has been generally shown in Figure 1 for both the right and left portion of the system and more particularly detailed, as to the right hand portion only, in Figure 2. In the former view, a flap motor 25 of double acting fluid type, and supplied by conduits or fluid lines 20 and 21 leading to a common source (not shown), is suitably connected to a motion transmission means or double ended torque shaft 26, and from each end of this torque shaft a foldable drive linkage 27 extends outwardly for connection with suitable shaft and crank means 28 in turn connected to a levered hinge 22 for the flap elements 16 by push-pull rod 29. Also from each end of the torque shaft 26 a telescopically arranged, substantially rigid torque tube 32 extends inwardly to a crank means 33 which is operatively connected through a push-pull rod 34 to levered hinge 23 for the flap elements 17.

It should be noted that the two halves of the above described system consist of similar parts and elements differentiated only by the right and left hand operational requirements of each where such is necessary. Moreover, each of the foldable linkages 27 includes a hinge fitting 35 (Figure 1) which, when the flap elements 16 are closed, moves to a position where its hinge axis coincides with the wing fold axis 14. This is necessary to obtain the desired wing folding action and yet be able to actuate the flap elements 16 in the preferred manner.

The structure of the flap operating mechanism is disclosed in Figure 2 for the right hand portion only generally illustrated in Figure 1. It is of course obvious that the structure of the right hand portion is to be oppositely duplicated for the left hand portion. In the detailed view the flap motor is mounted on the main spar 24 (Figure 5) for pivotal movement between a pair of brackets 36. The piston 30 through its rod 37 is operatively connected to a crank arm 38 and this crank is rigidly affixed on the torque shaft 26 substantially midway of its ends. Torque shaft main support bearings 39 located at each side of the hub of crank 38 are carried by bearing housings 41 which are mounted in brackets 42 on the main spar 24. The bearings 39, in the form of plain bushings, are held against axial movement by the hub structure of the crank, and when assembled a series of bolts 43 are then utilized to secure the crank hub to the torque shaft. The torque shaft is also operatively mounted in a series of spaced bearings at 45 and 46. The bearing 46, at the outer end of the shaft, is shown in sectional plan in Figure 3 and includes a housing 47 secured in the wing rib member 48, a plain bushing 49 pressed into the housing and dimensioned to receive the torque tube 32 and a spacer sleeve 50 mounted over the end of the shaft 26 and internally of the torque tube. This bearing assembly is secured together by a drive fitting 52 which abuts the outer end face of the bushing 49 and is so held by bolts 53 in the manner clearly shown in Figure 3.

The bearing 45, shown in Figure 4 and located inwardly of the end bearing 46, comprises a plain bushing 54 pressed into the end of the torque tube 32 to receive the shaft 26, and a second plain bushing 55 carries in a housing 56 secured to a wing rib 57. The tube 32 is prevented from axial displacement by the restraining effect of the fitting 52 and the abutment of the hub portion 58 of crank 33. Prior to the assembly of the parts above mentioned the crank 33 is secured to the torque tube 32 by rivets or the like as at 59. Between the bearings 45 and 46 there is an additional support bearing 60 (Figure 1) for the outer tube 32 and this bearing, mounted in a rib member, is substantially similar in construction and arrangement to the bearing 46 in so far as it concerns a bushing and housing therefor.

Referring again to Figure 2 the drive fitting 52 is formed to provide a boss structure 62 in which has been secured a stud or pivot element 63 for receiving a clevis fitting 64 which is connected to one of the elements of the foldable linkage 27. The pivot axis defined by element 63 is at an angle with respect to the longitudinal axis of the torque shaft 26 and hence the element acts as a crank arm.

The shaft and crank elements 28 for the flap element 16 includes generally (Figure 1) a shaft section 65 pivotally mounted in spaced bearings 66, each of which bearing is substantially similar to other such bearings already described, and a crank arm 67 to which the rod 29 is connected. The inner end of the shaft 65 is equipped with a driven fitting 68 which is substantially similar to the drive fitting 52 so that the foldable linkage 27 may be rendered effective as a means for rotating the shaft 65 in the desired manner and through the required angular displacement for moving the flap element 16.

A typical flap hinge structure 23 of the parallelogram type (Figure 2) and as applied to the flap element 17 includes a pair of bell cranks 69 and 70 pivotally mounted in a fixed bracket 72 on the wing 10, a first link 73 pivoted at the lower end of a flap bracket 74 and at spaced points to each of the bell cranks, a second adjustable actuator link 71 pivoted at the upper end of the flap bracket and to the bell crank 70, and a connector link 75 pivotally disposed between the upper ends of the bell cranks. The push-pull rod 34 is connected at the bellcrank 69 and acts to move this bell crank between predetermined limit positions defined by a pair of adjustable stop elements 76 carried in a bulkhead panel 77 of the wing structure. The upper stop contacts the edge face of the upper arm of bell crank 69 while the lower stop is contacted by a depending arm portion 78. The remaining hinge means for the other flap elements are similar to that above described and each such hinge includes a pair of stop elements for determining the extreme or flap closed and flap open positions.

The torque shaft 26, shown generally in Figure 1 and in more detail in Figure 2 and subsequent views, constitutes a resilient motion transmission means which is so arranged that its outer ends may rotate or twist relatively to the mid section which may be considered as effectively anchored by its connection with the crank 38. Thus upon rotary motion derived from the motor 25, the torque shaft tends to rotate throughout its length simultaneously and to the same angular degree of displacement as determined by the crank motion. Normally this has the desired effect of moving the flap elements simultaneously through the cooperation of the several cranks and push-pull rods above described. At zero air velocity the flaps will actually move in unison between full open and full closed positions. However, when there is an air load acting on the flaps, due to the forward motion of the aircraft for example, the angular displacement of the crank 38 at the mid zone of the torque shaft will not necessarily be reproduced at each outer end of the torque shaft since the shaft is resiliently yieldable in torsion. This shaft is designed to possess a predetermined degree of stiffness so that for normal flap air loads the motor can act to place the flaps in the desired position of displacement between full closed and full open. In this condition the flaps may be described as floating with respect to the torque shaft between the control force of the motor 25 and the counter force of the air loads. Any increase in air loads will cause the torque shaft to wind up under flap motion toward closed positions and of course any decrease in air loads will allow the torque shaft to unwind and permit further opening. This is highly desirable as the added lift due to flap movement toward open position will develop automatically with reduction of air speed.

The control of intermediate flap positions less than full closed or open may be accomplished by the aid of suitable flap position indicators which are calibrated to read in degrees of flap angular displacement. Then operation of the fluid motor control means (not shown) can be had without need for independent calibration of the forces developed by it at the crank 38. One such flap indicator, though not shown here since it forms no part of this invention, may include a flap indicator which is suitable for instrument panel mounting, a flexible shaft extending to one of the levered flap hinges and a connector between the shaft and a hinge link or bell crank whose angular displacement is proportional to or exactly follows the flap motion. Thus the motor control means can be moved or adjusted until the indicator response attains the desired flap angle reading.

The preferred system is also advantageous since the resiliency of the shaft 26 will allow for a holding load on the flaps in their closed positions. This holding load or pre-load is obtained by constructing the motor 25 with a piston stroke in excess of that required to move the flaps against the stop in closed position. Over travel of the piston will act to wind up the torque shaft a desired amount and until the piston reaches the limit of its retracting movement. As a consequence the closed flaps will be under pre-load sufficient to reduce, if not prevent, any flutter or vibration effects.

For full open flap positions against the stop limits the motor piston travel will cause its crank to over travel a desired angular amount with respect to the flap cranks and wind up the torque shaft to develop a pre-load in the system. However, the amount of torsional yielding of the shaft 26 is never so complete as to develop a permanent set or cause it to become rigid because it is desired to have sufficient resiliency for overload reactions at the flaps. In other words, the fully open flaps may move under overloads or impact forces so as to spill such loads thus effectively protecting them from damage and insuring proper mechanical safety for the operating system.

The various conditions of flap operation and torque shaft action is illustrated in the views of Figures 5 to 8 inclusive. In Figure 5 the flap 17 is shown in fully closed position against its stop element and the motor 25 is shown with its piston 30 in position (full line) to hold the flap fully closed and in position (dotted outline) at its extreme stroke position thus causing a relative angular displacement between cranks 38 and 33 and consequent pre-load or torsional wind up in the torque shaft 26. The first motion of the motor piston 30 to open the flaps merely absorbs the torque shaft wind up before the flaps actually move.

The showing of Figure 6 illustrates an intermediate flap position (in full line) and the floating movement thereof as permitted by the torque shaft 26 when an overload is impressed on the flap (dotted outline). The balancing of the fluid motor against flap air loads has been noted in connection with the flap position indicator discussion.

In Figure 7 the flap has been moved to full open position against the full open stop element and the operating system is indicated in full line for this condition. The dotted outline of the crank 38 and piston 30 in this view serves to indicate the extent of over travel for pre-loading the flap as by torsional yielding of the shaft 26.

The further view of Figure 8 is illustrative of a flap overload reaction (dotted outline) and the consequent yielding action of the torque shaft to enable the flap to spill such overload.

In actual use in aircraft the present flap operating mechanism functions, with only slight differences in feel, exactly as the more usual and directly rigidly connected flap systems. However, the advantages over the usual flap operating systems reside in the torsional yielding characteristics of the means 26 and in the resulting automatic load relieving action permitted thereby. This feature has particular merit for seaplane operation where impact water loads are generally responsible for damage to flap surfaces. With the present resilient flap mechanism such impact loads act against non-rigidly held surfaces and consequently the force may be dissipated quickly and easily with no apparent change in the flight characteristics or feel of the aircraft. In other words the flaps are self balancing under existing loads and through a given load range.

The foregoing detailed description has set forth a preferred system for operating and controlling auxiliary lift means, but what has been said should be understood as being instructive of the principles involved for it will be possible to make certain changes and alterations in the specific mechanism without departing from the spirit in which this disclosure is made or from the scope of the invention as defined by the claims annexed hereto.

What is claimed is:

1. In an aircraft having a wing, a flap hingedly mounted on said wing for movement from a closed position to an open position, a stop element for determining said flap open position, a power unit for moving said flap, operating means for said flap, and a resilient torque shaft having a connection with said power unit and a connection with said operating means, said torque shaft being constructed and arranged to cause flap movement between its closed and open positions and to yield under the action of said power unit when said flap has reached its open position as determined by said stop element, thereby pre-loading said flap.

2. In an aircraft having a wing, a flap mounted on the wing for movement from a closed position to an open position, a stop for determining the open position of said flap, operating means for said flap including an element arranged to abut said stop, a power unit constructed to have an effective movement in excess of that required for moving said flap to open position as determined by abutment of said element with said stop, and a resilient torque shaft operably connected to said power unit and to said flap operating means, said torque shaft being constructed and arranged to move said flap to open position and thereafter yield under the excess movement of said power unit for exerting a pre-load on said flap.

3. In an aircraft having a wing, a flap mounted on the wing for movement from a closed position to an open position, a stop for determining the open position of said flap, operating means for said flap including an element adapted to abut said stop, a power unit constructed to have an effective movement in excess of that required for moving said flap to open position as determined by abutment of said element with said stop, and a resilient torque shaft operably connected to said power unit and to said flap operating means, said resilient torque shaft being yieldable under the excess movement of said power unit for exerting a pre-load on said flap when in open position, but yieldable under flap overload conditions for permitting closing flap movement to relieve such overloads.

4. In an aircraft, wing structure having a pair of flaps hinged thereto, a pair of axially aligned torque tubes mounted in said wing structure and each having a plurality of spaced operating connections with one of said flaps, an elongated torsional spring in coaxial relation with said torque tubes and connected at each end with one of said torque tubes adjacent the outer end of the latter, stop means for limiting opening movement of the flaps and against the resistance of which the torsional spring may be flexed, and actuating means connected to the torsional spring at a point between the inner ends of said torque tubes, said actuating means being adapted to overtravel the flap movement for pre-loading the torsional spring in the open position of the flaps.

5. In an aircraft, wing structure having a pair of flaps hinged thereto, a pair of axially aligned torque tubes mounted in said wing structure and each having a plurality of spaced operating connections with one of said flaps, an elongated torsional spring in coaxial relation with said torque tubes and connected at each end with one of said torque tubes adjacent the outer end of the latter, and operating means for effecting angular movement of the torsional spring secured thereto at a point between the inner ends of said torque tubes.

6. In an aircraft, an airfoil structure having a flap mounted thereon for movement between open and closed positions, flap operating mechanism comprising an actuator and a resilient element, said actuator and resilient element being connected and acting between the flap and said structure, stop means effective between the flap and said structure for limiting opening movement of the flap before full travel of said actuator, whereby the actuator is arranged to overtravel the flap in opening movement after the flap has reached the limit position determined by said stop means and whereby the actuator during such overtravel elastically deforms the resilient element to cause the latter to exert a force upon the flap for maintaining it in said limit position in the presence of normal air loads but the resilient element may further yield elastically when the flap is overloaded to provide for closing movement of the flap to relieve the overload.

EDWARD L. MOYER.

REFERENCES CITED

The following references are of record in the file of this patent:

UNITED STATES PATENTS

| Number | Name | Date |
|---|---|---|
| 1,729,210 | Delage | Sept. 24, 1929 |
| 1,971,592 | Zaparka | Aug. 28, 1934 |
| 2,031,177 | Northrop | Feb. 10, 1936 |
| 2,195,035 | Molloy | Mar. 26, 1940 |
| 2,262,968 | Schmidt et al. | Nov. 18, 1941 |
| 2,316,235 | Gast | Apr. 13, 1943 |
| 2,370,844 | Davis | Mar. 6, 1945 |